Patented Nov. 6, 1928.

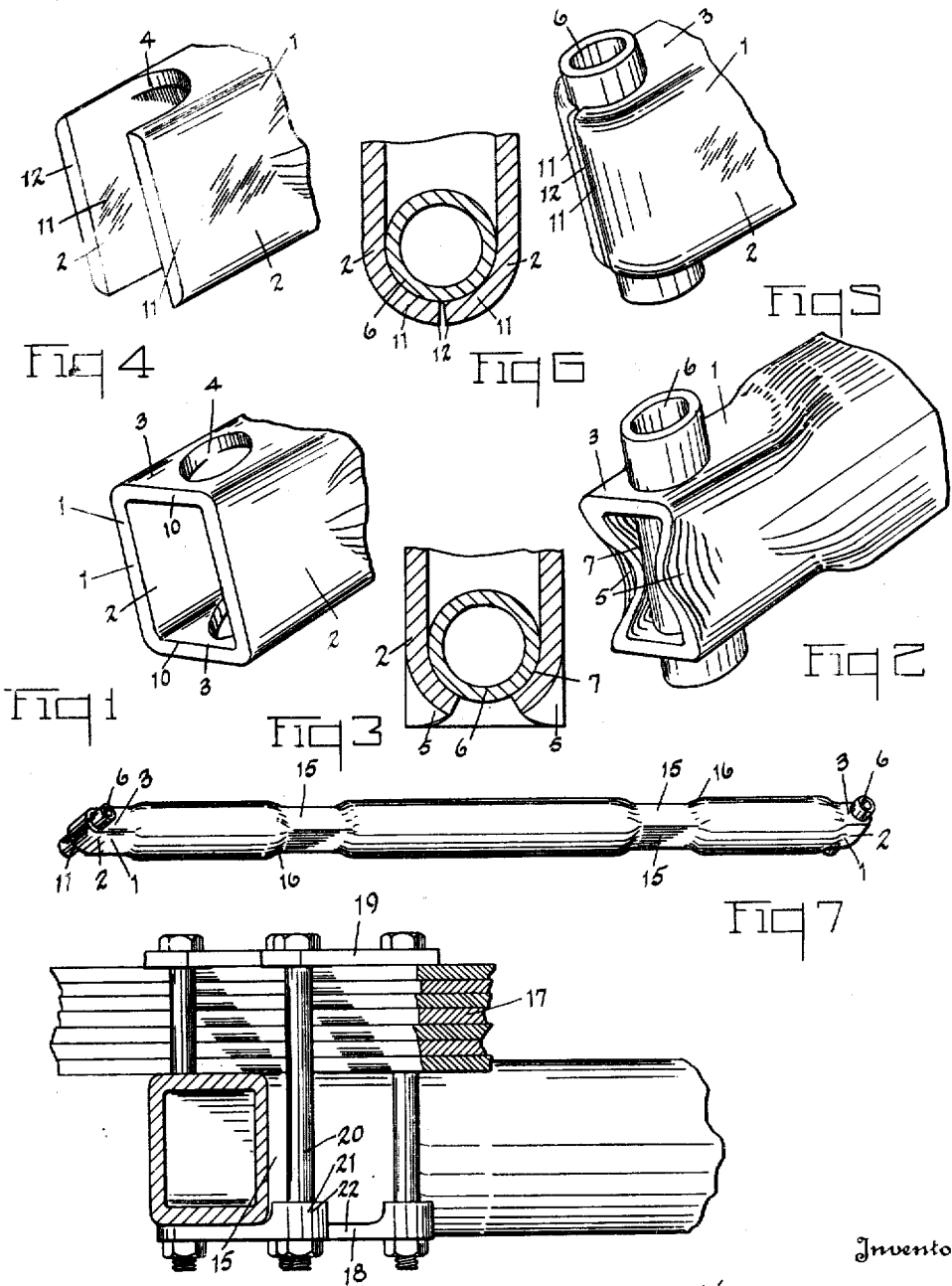

1,690,511

UNITED STATES PATENT OFFICE.

BERTIS H. URSCHEL, OF BOWLING GREEN, OHIO, ASSIGNOR TO URSCHEL ENGINEERING COMPANY, OF BOWLING GREEN, OHIO, A CORPORATION OF OHIO.

AXLE FOR SELF-PROPELLED VEHICLES.

Application filed March 7, 1928. Serial No. 259,798.

My invention has for its object to provide a light weight and an exceedingly strong, durable, axle for automobiles, trucks, and the like. The invention particularly has for its object to provide an axle formed of steel tubing and having parts thereof so constructed and shaped that the axle will withstand the stresses and strains to which such axles are ordinarily subjected and will, by reason of its tubular form, be lighter in weight than the ordinary solid axle commonly used in connection with self-propelled vehicles and, moreover, is such that it may be made at a low cost of production.

The invention particularly provides for connecting a tubular axle with the frame of a vehicle and also with the stub axles of the guiding wheels of the vehicles, such as the front wheels, of an ordinary automobile or self-propelled truck.

The invention also has for its object other features and advantages that render such axles applicable to the needs of the present day automobile or truck and which will appear from the following description, and upon examination of the drawing.

The invention may be contained in axle structures that vary in their details and, to illustrate a practical application of the invention, I have selected an axle containing the invention as an example of the various constructions that embody the invention, and shall describe it hereinafter. The axle selected is shown in the accompanying drawing.

Fig. 1 of the drawing illustrates a perspective view of the end of the tube as formed in one of the steps of formation of the tubular axle. Fig. 2 illustrates the form of the tube produced in another step of the process of shaping the tube. Fig. 3 is a view of the horizontal section through the end of the tube. Fig. 4 illustrates the form of the tube, produced in a step that succeeds the shaping of the end of the tube in the form shown in Fig. 1, when making a modified form of axle. Fig. 5 is a perspective view of the end of the tube and illustrates another step in the process of shaping the tube after it has been shaped as illustrated in Fig. 4. Fig. 6 is a view of the horizontal section of the axle of the tube shown in Figs. 4 and 5 through the end of the tube. Fig. 7 is a perspective view of the axle shown in Figs. 4, 5, and 6. Fig. 8 illustrates the manner in which the axle may be secured to the springs of the vehicle.

In shaping the ends of the axle, to produce a means for withstanding the torque that the axle is subjected at the knuckle on the stub axles of the supporting wheels of the vehicle, the ends of the axle are formed with flattened parallel side walls and suitable pins, solid or hollow, are inserted in the ends of the axle and so as to fit between the side walls, the stub axles being swiveled on the solid or in the hollow pins, according to the type of bracket to which a stub axle is connected, or with which it is integrally formed. Where the stub axle is connected with a king pin, the pin may be inserted through the end of the axle, that is, through the hollow pin or tube that is inserted therein. Or, when the stub axles are connected to brackets having collars or eyes, they may be suitably connected so as to swivel on the ends of, preferably, solid pins that may be inserted through the ends of the axle. A part of the invention, however, resides in so forming the ends of the axle that it will withstand heavy stresses and strains that such axles are ordinarily subjected at these points.

In the forms of construction shown in the drawings, the ends of the tube from which the axle is formed, is shaped into substantially rectangular portions 1, as shown in Fig. 1. Preferably, the rectangular shape is oblong in form to produce the vertical side walls 2 and the bottom and top walls 3. The cross sectional area of the ends are considerably smaller than the cross sectional area of the tube over which they are formed and, consequently, the walls are increased in thickness. The walls 2, preferably, have a height materially greater than the width of the top and bottom walls 3. The walls 2, moreover, are spaced apart a distance substantially equal to the diameter of the pins or short tubes that are to be located in the ends of the axle for the purpose of connecting the ends of the axle to the stub axles of the vehicles.

The side walls are shaped so as to closely fit around the pins or tubes that are inserted in the ends of the axle. The top and bottom walls 3 are provided with holes 4 that have diameters substantially the same as the distances between the parallel side walls 2 and the solid or hollow pins are inserted in the holes 4. In the form of construction of the axle end, shown in Fig. 2, the side walls 2 are bent along their central portions, as at 5, around the short tubes 6, so as to cause a portion of the side walls 2 to fit around the outer side of the tubes 6 as along the substantially cylindrical surface. The end portions of the walls 2 will thus conform substantially to an hour glass shape. The tubes 6 may then be welded at their points of juncture with the walls 2 and 3 and thus securely held in position and sustained against any twisting movement.

In shaping the ends of the axle to conform to the structure shown in Fig. 5, the axle is provided with substantially rectangular shaped ends as shown in Fig. 1, and the holes 4 are bored. The diameter of the holes 4 are substantially the same as the distances between the walls 2 so that the planes of the inner surfaces of the walls 2 will be tangential to the cylindrical surfaces formed by the holes 4. The end portions 10 of the top and bottom walls 3 are cut away leaving the shape of the ends of the axle substantially as shown in Fig. 4. The bearing members, such as the short tubes 6, are then inserted between the walls 2 so as to lie in the semi-circular crotches formed by the edges of the top and bottom walls 3 where the holes 4 are formed. The ends 11 of the side walls 2 are then bent around the cylindrical surface of the tube 6, as shown in Fig. 5, whereby the outer side of the cylindrical surface of the tube 6 is placed in close contact with, and covered by, the ends 11 of the side walls 2. The edges 12 of the side walls 2 may then be welded to each other and to the tubes 6. Thus, in this form of construction, the side walls are in close contact with the tubes throughout relatively large areas and provide a means for securely holding the bearing tubes 6 in position as against any twisting of the tubes relative to the axle.

The tube from which the axle is formed, also has portions that are so shaped as to withstand the stresses to which it is subjected at the points where it is connected to the vehicle frame. It is provided with flattened portions at the points where it is connected to the springs of the vehicle. The flattened portions have a cross sectional area that is smaller than the cross sectional area of the tube from which the axle is formed and, consequently, the thickness of the walls of the tube are increased at these points. In the form of construction shown in the drawings, the axle is provided with the flattened portions 15 that are connected to the body portions of the axle by flaring portions 16.

The flattened portions 15, at each point where the axle is connected to the springs, may be located at an angle to each other which provides a means for so connecting the axle to the springs as to resist twisting of the axle relative to the springs. In the form of construction shown, the axle is made to conform to squares at these points, the flattened portions 15 being so shaped as to have substantially the same widths and so as to form a rectangle. Also, in the particular construction shown, two of the flattened portions are located parallel to each other and at right angles to the other two flattened portions, and the springs 17 are clamped to the axle at each of these points by means of the clamps 18 and 19 and the bolts 20 that extend through the clamps 18 and 19. Preferably, the clamps 18 are provided with bosses 21 that have curved inner surfaces 22 that fit the curved corners between the flattened portions 15 that form the side and bottom walls of the axle and thus securely connect the axle to the springs and prevent any rotation or angular movement of the axle relative to the vehicle.

I claim:

1. An axle for a vehicle comprising a tube having end portions formed substantially rectangular in shape and portions of the side walls of the ends bent around the ends of the axle.

2. An axle for a vehicle comprising a tube having end portions formed substantially rectangular in shape and portions of the side walls of the ends bent, their end edges being located in close proximity to each other.

3. An axle for a vehicle comprising a tube having substantially rectangular end portions, bearing members extending through the end portions and the side walls of the ends bent around the outer sides of the bearing members.

4. An axle for a vehicle comprising a tube having substantially rectangular end portions, short tubes extending through the end portions, the side walls of the ends bent around the outer sides of the said tubes, and means for securing the short tubes in the ends of the axle.

5. An axle for a vehicle comprising a tube having substantially rectangular end portions, short tubes extending through the end portions, the side walls of the ends bent around the outer sides of the said tubes, the ends of the said side walls welded together and to the tube.

6. An axle for a vehicle comprising a tube, the end portions of the tube formed substantially rectangular in shape and portions of the side walls of the ends bent circularly.

7. An axle for a vehicle comprising a tubular member having substantially a uniform cross sectional area throughout its length and stub axle bearing members integrally connected thereto and located in the ends of the tubular member, the tubular member having flattened portions spaced apart and from the ends of the tubular member and forming torque resisting surfaces for securing the axle to the vehicle.

8. An axle for a vehicle comprising a tubular member having stub axle bearing members secured in its ends and having depressed flattened portions spaced apart and from the ends of the tubular member and forming surfaces for connecting the axle to the vehicle and for preventing lengthwise displacement of the axle relative to the vehicle.

9. An axle for vehicles comprising a tubular member having reduced end portions of increased thickness and formed to receive bearing members of stub axles of the vehicles.

10. A vehicle axle comprising a tubular member having thickened walls at the ends and having holes in its ends and bearing members extending through and fitting the holes in the ends of the tubular member and means for securing the bearing members in the ends of the axle.

11. An axle comprising a tubular member, the ends of the tubular member having flattened side portions located in spaced and parallel relation, the end portions of the said side portions folded to close the ends of the tubular member the portions of the ends located between the flattened portions having openings and bearing members fitting the said openings and between the flattened side portions means for securing the bearing members in the ends of the tubular member.

12. An axle for a vehicle comprising a tubular member cylindrical in form substantially throughout its length and stub axle bearing members integrally connected thereto and located in the ends of the cylindrical member, the cylindrical member having flattened portions spaced apart and from the ends of the cylindrical member and forming torque resisting surfaces for securing the axle to the vehicle.

13. An axle for a vehicle comprising a tubular member cylindrical substantially throughout its length and having stub axle bearing members secured in its ends and having depressed flattened portions spaced apart and from the ends of the tubular member and forming surfaces for connecting the axle to the vehicle and for preventing lengthwise displacement of the axle relative to the vehicle.

14. An axle for a vehicle having knuckle supports, the axle comprising a tubular member cylindrical in form to points immediately adjacent the knuckle supports, the ends of the member having flattened side portions and bearing members extending through and secured in the ends and fitting between the flattened side portions.

In witness whereof I have hereunto signed my name to this specification.

BERTIS H. URSCHEL.

DISCLAIMER 1,690,511.—*Bertis H. Urschel,* Bowling Green, Ohio. AXLE FOR SELF-PROPELLED VEHICLES. Patent dated November 6, 1928. Disclaimer filed August 5, 1935, by the patentee.

Hereby enters this disclaimer to claim 9 of said patent, which is in the following words, to wit:

"9. An axle for vehicles comprising a tubular member having reduced end portions of increased thickness, and formed to receive bearing members of stub axles of the vehicles."

[*Official Gazette August 27, 1935.*]

flattened portions spaced apart and from the ends of the tubular member and forming surfaces for connecting the axle to the vehicle and for preventing lengthwise displacement of the axle relative to the vehicle.

9. An axle for vehicles comprising a tubular member having reduced end portions of increased thickness and formed to receive bearing members of stub axles of the vehicles.

10. A vehicle axle comprising a tubular member having thickened walls at the ends and having holes in its ends and bearing members extending through and fitting the holes in the ends of the tubular member and means for securing the bearing members in the ends of the axle.

11. An axle comprising a tubular member, the ends of the tubular member having flattened side portions located in spaced and parallel relation, the end portions of the said side portions folded to close the ends of the tubular member the portions of the ends located between the flattened portions having openings and bearing members fitting the said openings and between the flattened side portions means for securing the bearing members in the ends of the tubular member.

12. An axle for a vehicle comprising a tubular member cylindrical in form substantially throughout its length and stub axle bearing members integrally connected thereto and located in the ends of the cylindrical member, the cylindrical member having flattened portions spaced apart and from the ends of the cylindrical member and forming torque resisting surfaces for securing the axle to the vehicle.

13. An axle for a vehicle comprising a tubular member cylindrical substantially throughout its length and having stub axle bearing members secured in its ends and having depressed flattened portions spaced apart and from the ends of the tubular member and forming surfaces for connecting the axle to the vehicle and for preventing lengthwise displacement of the axle relative to the vehicle.

14. An axle for a vehicle having knuckle supports, the axle comprising a tubular member cylindrical in form to points immediately adjacent the knuckle supports, the ends of the member having flattened side portions and bearing members extending through and secured in the ends and fitting between the flattened side portions.

In witness whereof I have hereunto signed my name to this specification.

BERTIS H. URSCHEL.

DISCLAIMER 1,690,511.—*Bertis H. Urschel,* Bowling Green, Ohio. AXLE FOR SELF-PROPELLED VEHICLES. Patent dated November 6, 1928. Disclaimer filed August 5, 1935, by the patentee.

Hereby enters this disclaimer to claim 9 of said patent, which is in the following words, to wit:

"9. An axle for vehicles comprising a tubular member having reduced end portions of increased thickness, and formed to receive bearing members of stub axles of the vehicles."

[*Official Gazette August 27, 1935.*]